(12) United States Patent
Kawasaki et al.

(10) Patent No.: US 11,130,202 B2
(45) Date of Patent: Sep. 28, 2021

(54) FLUX, AND SOLDER PASTE

(71) Applicant: Senju Metal Industry Co., Ltd., Tokyo (JP)

(72) Inventors: Hiroyoshi Kawasaki, Tokyo (JP); Masato Shiratori, Tochigi (JP); Yoshinori Takagi, Saitama (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 16/757,440

(22) PCT Filed: Nov. 22, 2018

(86) PCT No.: PCT/JP2018/043146
§ 371 (c)(1),
(2) Date: Apr. 20, 2020

(87) PCT Pub. No.: WO2019/103090
PCT Pub. Date: May 31, 2019

(65) Prior Publication Data
US 2020/0384581 A1 Dec. 10, 2020

(30) Foreign Application Priority Data
Nov. 24, 2017 (JP) .............................. JP2017-226345

(51) Int. Cl.
*B23K 35/36* (2006.01)
*B23K 35/02* (2006.01)
(Continued)

(52) U.S. Cl.
CPC ........ *B23K 35/3613* (2013.01); *B23K 35/025* (2013.01); *B23K 35/262* (2013.01);
(Continued)

(58) Field of Classification Search
CPC ... B23K 35/3613; B23K 35/3615; C08K 5/20
See application file for complete search history.

(56) References Cited

U.S. PATENT DOCUMENTS

| 6,075,080 A | 6/2000 | Katsuoka et al. |
| 10,610,981 B2 | 4/2020 | Hayashi et al. |
(Continued)

FOREIGN PATENT DOCUMENTS

| CN | 1210772 A | 3/1999 |
| CN | 101585118 A | * 11/2009 |
(Continued)

OTHER PUBLICATIONS

CN-101585118-A English translaion (Year: 2009).*
(Continued)

*Primary Examiner* — Anthony J Zimmer
*Assistant Examiner* — Sean P. O'Keefe
(74) *Attorney, Agent, or Firm* — The Webb Law Firm

(57) ABSTRACT

A flux which imparts thixotropy, and which exhibits excellent printability, printing sagging-inhibiting ability, and heating sagging-inhibiting ability; and a solder paste which uses said flux. This flux includes a thixotropic agent, a rosin, an organic acid, and a solvent. The thixotropic agent includes a cyclic amide compound obtained by polycondensing a dicarboxylic acid and/or a tricarboxylic acid, and a diamine and/or a triamine into a cyclic shape; and an acyclic amide compound which is obtained by polycondensing a monocarboxylic acid, a dicarboxylic acid and/or a tricarboxylic acid into an acyclic shape. The flux includes at least 0.1 wt % but not more than 8.0 wt % of the cyclic amide compound, and at least 0.5 wt % but not more than 8.0 wt % of the acyclic amide compound. The total amount of the cyclic amide compound and the acyclic amide compound is at least 1.5 wt % but not more than 10.0 wt %.

20 Claims, 3 Drawing Sheets

(51) Int. Cl.
  *B23K 35/362* (2006.01)
  *C08K 5/20* (2006.01)
  *B23K 35/26* (2006.01)
  *C08K 3/08* (2006.01)
  *C22C 13/00* (2006.01)

(52) U.S. Cl.
  CPC .............. *B23K 35/362* (2013.01); *C08K 3/08* (2013.01); *C08K 5/20* (2013.01); *C22C 13/00* (2013.01)

(56) References Cited

U.S. PATENT DOCUMENTS

| | | | |
|---|---|---|---|
| 2006/0148044 A1* | 7/2006 | Panova | C12P 13/02 435/117 |
| 2013/0129658 A1* | 5/2013 | Nguyen-Kim | C08L 23/02 424/70.16 |
| 2015/0102090 A1* | 4/2015 | Arai | B23K 35/3613 228/224 |

FOREIGN PATENT DOCUMENTS

| | | |
|---|---|---|
| JP | H1177377 A | 3/1999 |
| JP | 3350767 B2 | 11/2002 |
| JP | 2014036985 A | 2/2014 |
| JP | 2017177166 A | 10/2017 |
| WO | 2017057651 A1 | 4/2017 |
| WO | 2017065076 A1 | 4/2017 |

OTHER PUBLICATIONS

Hans R. Kricheldorf, S. Bolhme, and G. Schwarz, "Macrocycles. 17. The Role of Cyclization in Kinetically Controlled Polycondensations. Polyamides," Macromolecules 2001, 34, 8879-8885 (Year: 2001).*

H. Zahn and Dr. G. B. Gleitsman, "Oligomers and Pleionomers of Synthetic Fiber-Forming Polymers" Angew. Chem. interntit. Edit. 1 vol. 2 (1963) No. 8, 410-420 (Year: 1963).*

* cited by examiner

FLUX, AND SOLDER PASTE

CROSS-REFERENCE TO RELATED APPLICATIONS

This application is the United States national phase of International Application No. PCT/JP2018/043146 filed Nov. 22, 2018, and claims priority to Japanese Patent Application No. 2017-226345 filed Nov. 24, 2017, the disclosures of which are hereby incorporated by reference in their entirety.

TECHNICAL FIELD

The present invention relates to a flux for use in soldering and a solder paste using the flux.

BACKGROUND

In general, a flux used in soldering has effects of chemically removing metal oxides present on solder and the metal surface of a joint target to be soldered and allowing movement of metal elements at the boundary between the two. Therefore, by soldering using the flux, an intermetallic compound can be formed between the solder and the metal surface of the joint target, so that strong joint can be obtained.

In a solder paste containing such a soldering flux and metal powder, thixotropy is imparted by a thixotropic agent contained in the flux. The thixotropic agent constructs a network in the flux and imparts thixotropy. When the flux has thixotropy, its viscosity lowers when shear force is applied thereto, so that the workability such as printability is improved. In addition, the flux contains the thixotropic agent, so that sagging of a solder paste after printing, which is referred to as printing sagging, and sagging of a solder paste when molten by heating, which is referred to as heating sagging, are held by the network formed by the thixotropic agent, thereby inhibiting sagging of the flux.

As the thixotropic agent, an amide-based thixotropic agent made of an amide compound obtained by dehydration condensation of a fatty acid and an amine is used from the viewpoints of imparting thixotropy, improving printability, and inhibiting printing sagging and heating sagging (for example, see Patent Document 1). Moreover, as the thixotropic agent, an ester-based thixotropic agent containing hydrogenated castor oil is used.

PRIOR ART DOCUMENTS

Patent Document 1: Japanese Patent No. 3350767

SUMMARY

In the amide-based thixotropic agent, intramolecular and intermolecular hydrogen bonds are easily formed due to an amide bond, and a high-molecular polymer provides poor compatibility and is difficult to be uniformly dispersed, resulting in unstable printability. In addition, an increase in amount of a high-molecular amide compound causes an extreme increase in viscosity, resulting in poor printability. Furthermore, even an ester-based thixotropic agent, when used, cannot sufficiently inhibit heating sagging.

The present invention has been made to solve such problems, and an object of the invention is to provide a flux which imparts thixotropy and is excellent in printability, printing sagging-inhibiting ability, and heating sagging-inhibiting ability, and a solder paste using the flux.

It has been found that a flux containing a thixotropic agent containing a cyclic amide compound and an acyclic amide compound can improve thixotropy, and that a solder paste containing this flux and metal powder can improve printability and inhibit printing sagging and heating sagging.

Therefore, the present invention is a flux including an organic acid, a rosin, a thixotropic agent, and a solvent, in which the thixotropic agent contains a cyclic amide compound and an acyclic amide compound. The thixotropic agent contains 0.1 wt % or more and 8.0 wt % or less of the cyclic amide compound and 0.5 wt % or more and 8.0 wt % or less of the acyclic amide compound, and a total amount of the cyclic amide compound and the acyclic amide compound is 1.5 wt % or more and 10.0 wt % or less. The cyclic amide compound is an amide compound with a molecular weight of 3,000 or less, obtained by cyclic polycondensation of a dicarboxylic acid and/or a tricarboxylic acid, and a diamine and/or a triamine. The acyclic amide compound is an amide compound obtained by acyclic condensation of a monocarboxylic acid, a dicarboxylic acid, and/or a tricarboxylic acid, and a monoamine, a diamine, and/or a triamine.

The dicarboxylic acid and the tricarboxylic acid of the cyclic amide compound have 3 or more and 10 or less carbon atoms. More preferably, the dicarboxylic acid and the tricarboxylic acid of the cyclic amide compound have 6 or more and 10 or less carbon atoms.

The diamine and the triamine of the cyclic amide compound have 2 or more and 54 or less carbon atoms. More preferably, the diamine and the triamine of the cyclic amide compound have 6 carbon atoms.

Preferably, the cyclic amide compound is an amide compound obtained by cyclic polycondensation of a dicarboxylic acid having 3 or more and 10 or less carbon atoms and a diamine having 2 or more and 54 or less carbon atoms. More preferably, the cyclic amide compound is an amide compound obtained by cyclic polycondensation of a dicarboxylic acid having 6 or more and 10 or less carbon atoms and a diamine having 6 carbon atoms.

Preferably, the monocarboxylic acid, the dicarboxylic acid, and the tricarboxylic acid of the acyclic amide compound have 2 or more and 28 or less carbon atoms, and the monoamine, the diamine and the triamine of the acyclic amide compound have 0 or more and 54 or less carbon atoms.

Preferably, the thixotropic agent further contains an ester compound. Preferably, the thixotropic agent contains hydrogenated castor oil as the ester compound.

More preferably, the thixotropic agent contains 0.1 wt % or more and 1.5 wt % or less of the cyclic amide compound and 0.5 wt % or more and 4.0 wt % or less of the acyclic amide compound. Furthermore, the thixotropic agent preferably contains 0 wt % or more and 8.0 wt % or less of the ester compound.

In addition, the flux preferably contains 30 wt % or more and 60 wt % or less of the rosin and 0.2 wt % or more and 10 wt % or less of the organic acid. Further, the flux preferably includes 0 wt % or more and 20 wt % of an amine, 0 wt % or more and 5 wt % or less of an organohalogen compound, 0 wt % or more and 2 wt % or less of an amine hydrohalide, and 0 wt % or more and 5 wt % or less of an antioxidant.

Moreover, the present invention is a solder paste including the flux described above and metal powder.

In the thixotropic agent containing a cyclic amide compound and an acyclic amide compound, the acyclic amide compounds are crosslinked by the low-molecular cyclic amide compounds, so that the flux of the present invention can improve thixotropy and inhibit precipitation of the thixotropic agent, without increasing the content of the acyclic amide compound, as compared with the case where the thixotropic agent contains the acyclic amide compound.

In the solder paste using this flux, it is possible to obtain good printability with inhibited bleeding, blurring, and the like, and also to inhibit printing sagging in which the solder paste after printing flows. Furthermore, it is possible to inhibit heating sagging of the solder paste caused by heating at the time of soldering.

DETAILED DESCRIPTION

<Example of Flux According to Present Embodiment>

A flux of a present embodiment contains a thixotropic agent, a rosin, an organic acid, and a solvent. The thixotropic agent contains a cyclic amide compound and an acyclic amide compound.

The cyclic amide compound is a low-molecular amide compound with a molecular weight of 3,000 or less, in particular, a molecular weight of 1,000 or less, obtained by cyclic polycondensation of a dicarboxylic acid and/or a tricarboxylic acid, and a diamine and/or a triamine. Further, the acyclic amide compound is an acyclic amide oligomer with a molecular weight of 3,000 or less or an acyclic high-molecular amide polymer with a molecular weight of more than 3,000, obtained by acyclic polycondensation of a monocarboxylic acid, a dicarboxylic acid, and/or a tricarboxylic acid, and a monoamine, a diamine, and/or a triamine.

Figure 1:
FIG. 1 is a schematic view showing an outline of the molecular structure of a dicarboxylic acid.
Figure 2:
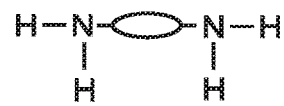
FIG. 2 is a schematic view showing an outline of the molecular structure of a diamine.
Figure 3:
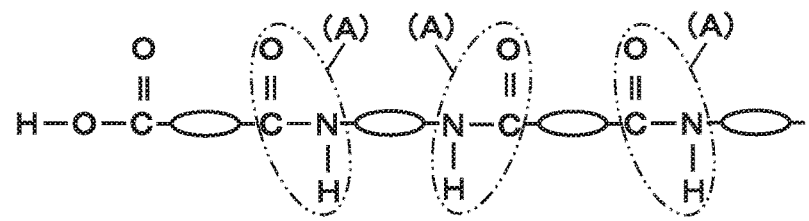
FIG. 3 is a schematic view showing an outline of the molecular structure of an acyclic amide compound.

FIG. 1 is a schematic view showing an outline of the molecular structure of a dicarboxylic acid. FIG. 2 is a schematic view showing an outline of the molecular structure of a diamine. FIG. 3 is a schematic view showing an outline of the molecular structure of an acyclic amide compound. By polycondensation (dehydration condensation) of the dicarboxylic acid shown in FIG. 1 and the diamine shown in FIG. 2, an acyclic amide compound is synthesized, as shown in FIG. 3.

In a thixotropic agent containing the acyclic amide compound shown in FIG. 3, polycondensation of a carboxyl group (COOH) of the dicarboxylic acid shown in FIG. 1 and an amino group ($NH_2$) of the diamine shown in FIG. 2 forms an amide bond, and intramolecular and intermolecular hydrogen bonding of hydrogen (H) and oxygen (O) in an amide group C(=O)—NH forms a network. The amide bond sites are denoted by (A), and the hydrogen bond sites are denoted by (B).

Figure 4:
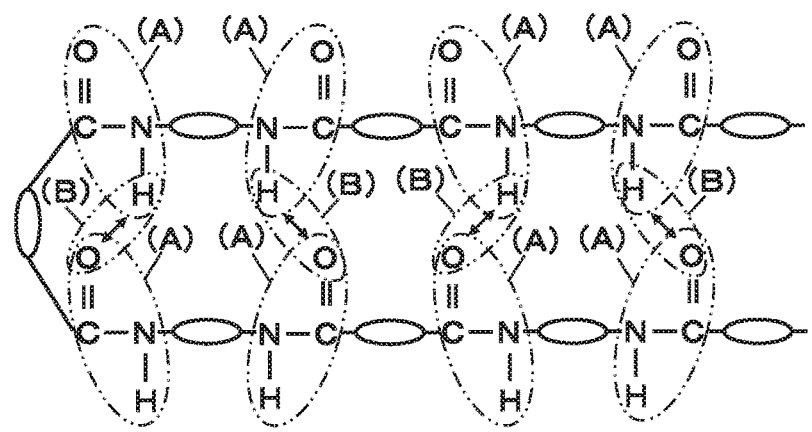
FIG. 4 is a schematic view showing an outline of the molecular structure of an acyclic amide compound.

FIG. 4 is a schematic view showing an outline of the molecular structure of an acyclic amide compound. When the acyclic amide compound is formed into a high-molecular polymer, the formation of hydrogen bonds (B) proceeds in the molecule as shown in FIG. 4. Therefore, the solubility (compatibility) may become very poor in the flux and coarse precipitation may occur in the flux, resulting in poor thixotropy. Moreover, in a solder paste in which such a flux and metal powder are mixed, printability is poor and printing sagging and heating sagging are generated.

Therefore, by using cyclic amide compounds in combination with acyclic amide compounds, the acyclic amide compounds are crosslinked by the cyclic amide compounds through non-covalent interactions to construct a relatively uniform thixotropic agent component network, thereby inhibiting excessive precipitation of the thixotropic agent.

Figure 5:
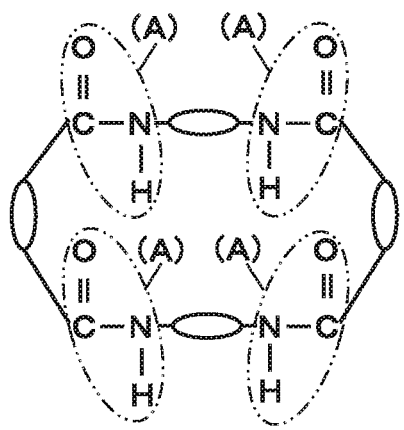
FIG. 5 is a schematic view showing an outline of the molecular structure of a cyclic amide compound.

FIG. 5 is a schematic view showing an outline of the molecular structure of a cyclic amide compound. Now, by polycondensation of the dicarboxylic acid shown in FIG. 1 and the diamine shown in FIG. 2, a cyclic amide compound is synthesized as a low-molecular amide, as shown in FIG. 5.

The cyclic amide compound has higher symmetry than that of the acyclic amide compound, and thus has the property of being easy to crystallize as compared with the acyclic low-molecular amide. On the other hand, the acyclic low-molecular amide has a polar end group, and thus is easily compatible in the flux and is difficult to crystallize. Therefore, it is difficult to impart thixotropy due to network formation. On the other hand, the cyclic amide compound does not have a polar end group, and thus is hardly compatible in the flux and easily imparts thixotropy due to network formation.

Thus, it is considered that, in the thixotropic agent containing the cyclic amide compound and the acyclic amide compound, intermolecular hydrogen bonding between the cyclic amide compound and the acyclic amide compound is promoted, thereby inhibiting hydrogen bonding in the molecules of the acyclic amide compound.

Figure 6:
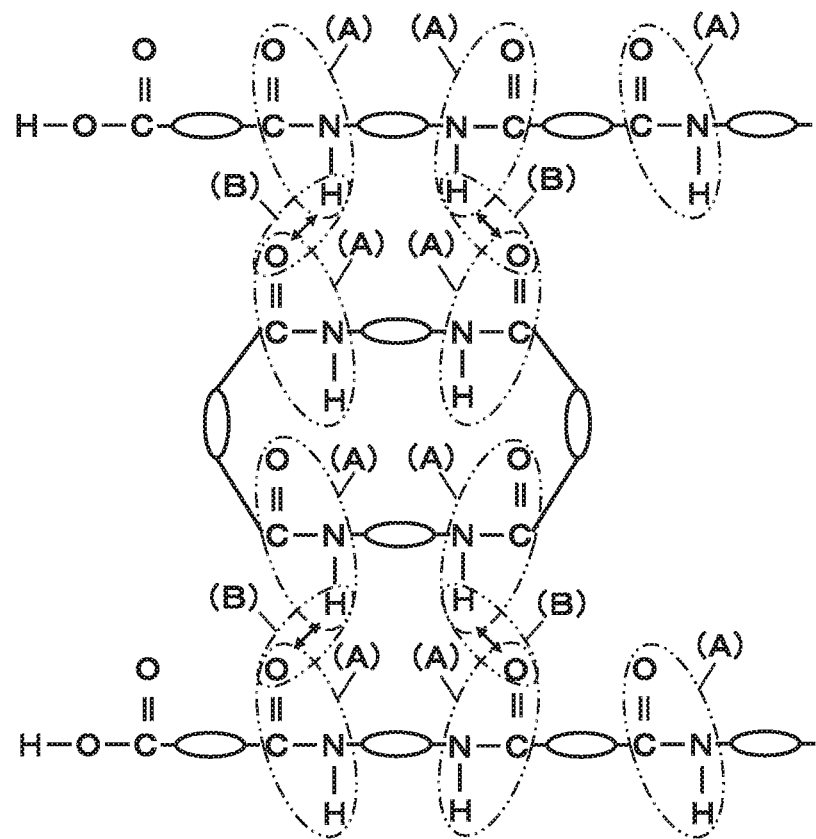
FIG. 6 is a schematic view showing an outline of the molecular structure obtained by crosslinking the acyclic amide compounds by the cyclic amide compound.

FIG. 6 is a schematic view showing an outline of the molecular structure in which the acyclic amide compounds are crosslinked by the cyclic amide compounds. It is considered that, in the thixotropic agent containing the cyclic amide compound and the acyclic amide compound, hydrogen-bonds (B) between the cyclic amide compound and the acyclic amide compound, as shown in FIG. 6, construct a relatively uniform component network in which the acyclic amide compounds are crosslinked by the cyclic amide compounds through non-covalent interactions.

Therefore, in a flux containing the thixotropic agent containing the cyclic amide compound and the acyclic amide compound, excessive precipitation of the thixotropic agent is inhibited and the thixotropy is excellent, as compared with the case where the thixotropic agent contains the acyclic amide compound. Moreover, in a solder paste containing metal powder and the flux containing the thixotropic agent containing the cyclic amide compound and the acyclic amide compound, the printability is excellent, printing sagging is inhibited, and, further, heating sagging is inhibited.

The cyclic amide compound and the acyclic amide compound are represented as [n+n] type, where n is the number of carboxylic acid molecules and n is the number of amine molecules. As the cyclic amide compound, [1+1] type to [n+n] type are constructed. The cyclic amide compound preferably includes [1+1] type to [3+3] type, and particularly preferably is [2+2] type. FIG. 5 shows an example of [2+2] type in which a dicarboxylic acid and a diamine are polycondensed in a cyclic manner, and the cyclic amide compound is preferably [2+2] type in which a dicarboxylic acid and a diamine are polycondensed in a cyclic manner.

The cyclic amide compound also includes: [2+2] type in which a tricarboxylic acid and a diamine are polycondensed in a cyclic manner and one of the functional groups of the tricarboxylic acid is in a free state of being unbound to another compound; [2+3] type in which a tricarboxylic acid and a diamine are polycondensed in a cyclic manner to form a cage structure; and [3+2] type in which a dicarboxylic acid and a triamine are polycondensed in a cyclic manner to form a cage structure.

Thus, the cyclic amide compound may be any of an amide oligomer obtained by cyclic polycondensation of a dicarboxylic acid and a diamine, an amide oligomer obtained by cyclic polycondensation of a tricarboxylic acid and a diamine, an amide oligomer obtained by cyclic polycondensation of a dicarboxylic acid and a triamine, an amide oligomer obtained by cyclic polycondensation of a tricarboxylic acid and a triamine, an amide oligomer obtained by cyclic polycondensation of a dicarboxylic acid and a tricarboxylic acid and a diamine, an amide oligomer obtained by cyclic polycondensation of a dicarboxylic acid and a tricarboxylic acid and a triamine, an amide oligomer obtained by cyclic polycondensation of a dicarboxylic acid and a diamine and a triamine, an amide oligomer obtained by cyclic polycondensation of a tricarboxylic acid and a diamine and a triamine, and an amide oligomer obtained by cyclic polycondensation of a dicarboxylic acid and a tricarboxylic acid and a diamine and a triamine.

Further, when the acyclic amide compound is an amide compound containing a monocarboxylic acid or a monoamine, for example, when the acyclic amide compound is an amide compound obtained by acyclic polycondensation of a monocarboxylic acid and a diamine and/or a triamine or when the acyclic amide compound is an amide compound obtained by acyclic polycondensation of a dicarboxylic acid and/or a tricarboxylic acid and a monoamine, the monocarboxylic acid and the monoamine function as terminal molecules, resulting in an acyclic amide oligomer with a reduced molecular weight. Further, when the acyclic amide compound is an amide compound obtained by acyclic polycondensation of a dicarboxylic acid and/or a tricarboxylic acid, and a diamine and/or a triamine, an acyclic high-molecular amide polymer is formed. Furthermore, the acyclic amide compound also includes an amide compound obtained by acyclic condensation of a monocarboxylic acid and a monoamine.

The reason why an amide compound obtained by acyclic condensation of a monocarboxylic acid and a monoamine can form a network will be described below.

Figure 7:
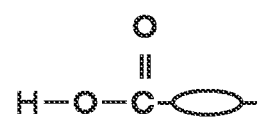
FIG. 7 is a schematic view showing an outline of the molecular structure of a monocarboxylic acid.
Figure 8:
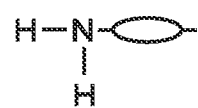
FIG. 8 is a schematic view showing an outline of the molecular structure of a monoamine.
Figure 9:
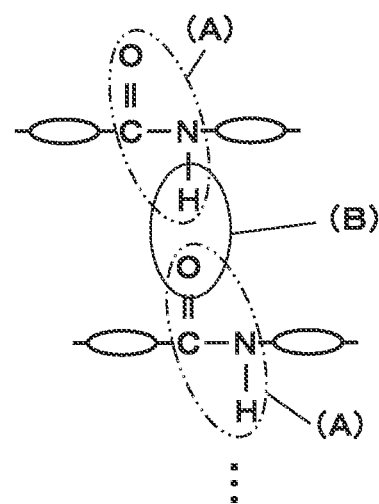
FIG. 9 is a schematic view showing an outline of the molecular structure of an acyclic amide compound obtained by condensation of a monocarboxylic acid and a monoamine.

FIG. 7 is a schematic view showing an outline of the molecular structure of a monocarboxylic acid. FIG. 8 is a schematic view showing an outline of the molecular structure of a monoamine. FIG. 9 is a schematic view showing an outline of the molecular structure of an acyclic amide compound obtained by condensation of a monocarboxylic acid and a monoamine.

A carboxyl group (COOH) of the monocarboxylic acid shown in FIG. 7 and an amino group ($NH_2$) of the monoamine shown in FIG. 8 form an amide bond by condensation, thereby forming the acyclic amide compound shown in FIG. 9. In addition, hydrogen (H) and oxygen (O) in an amide group C(=O)—NH of the acyclic amide compound are linked through intermolecular hydrogen bonding. The amide bond sites in the molecules of the acyclic amide compound are denoted by (A), and the hydrogen bond sites between the molecules of the acyclic amide compound are denoted by (B).

Thus, monoamides (monoamides) each having one amide group in the molecule are linked through hydrogen bonds. An aggregate of such monoamides through hydrogen bonds is treated as a supermolecule. The supermolecule refers to an aggregate of molecules constructed from non-covalent interactions such as hydrogen bonds or hydrophobic interactions. The hydrogen bonds show strong interaction and form a stable structure.

The acyclic amide compounds, which are monoamides formed by condensation of a monocarboxylic acid and a monoamine, are linked through interactions by hydrogen bonds derived from the amide bonds. Additionally, cross-linked sites are formed by interactions between the molecular chains linked through interactions by hydrogen bonds, especially, the molecular chains linked through hydrogen bonds derived from the amide bond in the main chain, hydrophobic interactions due to the side chain, or the like, and grow into a three-dimensional network.

As described above, it is understood that the acyclic amide compounds in which a monocarboxylic acid and a monoamine are condensed have only a single amide group, but can be bound through non-covalent interactions by hydrogen bonds to form a network.

The cyclic amide compound contained as the thixotropic agent is an amide compound obtained by cyclic polycondensation of a dicarboxylic acid and/or a tricarboxylic acid, and a diamine and/or a triamine and having two or more amide groups.

Thus, the cyclic amide compounds are added to the thixotropic agent, so that the acyclic amide compounds, which are each an aggregate of monoamides linked through interactions by hydrogen bonds, are linked via the cyclic amide compounds.

It is considered that, in a solder paste using a flux in which a thixotropic agent contains a cyclic amide compound and an acyclic amide compound, the cyclic amide compound and the acyclic amide compound form a network, so that thixotropy is imparted.

However, if the content of the cyclic amide compound and the acyclic amide compound is too small, no sufficient network can be formed, so that thixotropy is not imparted.

On the other hand, in a thixotropic agent containing no cyclic amide compound or having a cyclic amide compound content less than the amount defined in the present invention, if the acyclic amide compound is excessively contained, excessive interactions occur in the molecules and between molecules of the acyclic amide compound, so that aggregation and precipitation are likely to occur.

It is considered that, as a result, the rheological properties as the flux are impaired (poor printability due to crystal precipitation) and that the density of the thixotropic agent is low in a portion where no aggregate is formed, thereby causing a state of substantial lack in thixotropic agent as described above, so that the flux cannot exert the effect.

On the other hand, a cyclic amide compound obtained by cyclic polycondensation of a dicarboxylic acid and/or a tricarboxylic acid and a diamine and/or a triamine and an acyclic amide compound obtained by acyclic condensation of a monocarboxylic acid, a dicarboxylic acid, and/or a tricarboxylic acid and a monoamine, a diamine, and/or a triamine are used in combination in the contents defined in the present invention, so that the acyclic amide compounds are crosslinked by the cyclic amide compounds through non-covalent interactions to construct a relatively uniform thixotropic agent component network, thereby making it possible to inhibit excessive precipitation of the thixotropic agent. The effect due to use of the cyclic amide compounds and the acyclic amide compounds in combination is exerted even if the molecular weight of the acyclic amide compound is 3,000 or less or more than 3,000, as long as the contents of the cyclic amide compound and the acyclic amide compound fall within the ranges defined in the present invention.

In addition, when the ratio of the total mole number of the carboxyl groups of the dicarboxylic acid and/or the tricarboxylic acid to the total mole number of the amino groups of the diamine and/or the triamine is 1:1, the acyclic amide compound has the highest molecular weight. On the other hand, when the ratio of the total mole number of the carboxyl groups of the dicarboxylic acid and/or the tricarboxylic acid to the total mole number of the amino groups of the diamine and/or the triamine is 1:m or m:1 (m>1), an acyclic amide oligomer having a reduced molecular weight is formed. Preferably, the ratio is 1:2 to 2:1.

The dicarboxylic acid and the tricarboxylic acid of the cyclic amide compound have 3 or more and 10 or less carbon atoms, and more preferably have 6 or more and 10 or less carbon atoms.

Moreover, the diamine and the triamine of the cyclic amide compound have 2 or more and 54 or less carbon atoms, and more preferably have 6 carbon atoms.

Furthermore, it is preferable that the monocarboxylic acid, the dicarboxylic acid, and the tricarboxylic acid of the acyclic amide compound have 2 or more and 28 or less carbon atoms, and the monocarboxylic acid, the dicarboxylic acid, and the tricarboxylic acid thereof have more preferably 2 or more and 18 or less carbon atoms, further preferably 2 or more and 10 or less carbon atoms, still further preferably 6 or more and 10 or less carbon atoms. The monoamine, diamine, and triamine of the acyclic amide compound preferably have 0 or more and 54 or less carbon atoms, and the monoamine, diamine, and triamine thereof more preferably have 0 or more and 18 or less carbon atoms, further preferably 0 or more and 10 or less carbon atoms, still further preferably 6 or more and 10 or less carbon atoms.

Examples of the dicarboxylic acid in the cyclic amide compound and the acyclic amide compound include adipic acid having 6 carbon atoms and sebacic acid having 10 carbon atoms.

Further, examples of the dicarboxylic acid in the cyclic amide compound and the acyclic amide compound include: aliphatic dicarboxylic acids such as malonic acid having 3 carbon atoms, succinic acid having 4 carbon atoms, glutaric acid having 5 carbon atoms, pimelic acid having 7 carbon atoms, suberic acid having 8 carbon atoms, azelaic acid having 9 carbon atoms, and cyclohexanedicarboxylic acid having 8 carbon atoms; and aromatic dicarboxylic acids such as a phthalic acid having 6 carbon atoms and terephthalic acid having 6 carbon atoms.

Further, examples of the tricarboxylic acid in the cyclic amide compound and the acyclic amide compound include cyclohexane tricarboxylic acid having 9 carbon atoms and benzene tricarboxylic acid having 9 carbon atoms.

Further, examples of the monocarboxylic acid in the acyclic amide compound include acetic acid having 2 carbon atoms, palmitic acid having 16 carbon atoms, stearic acid having 18 carbon atoms, 12-hydroxystearic acid having 18 carbon atoms, behenic acid having 22 carbon atoms, and montanic acid having 28 carbon atoms.

Examples of the diamine in the cyclic amide compound and the acyclic amide compound include 1,6-hexanediamine.

Further, examples of the diamine in the cyclic amide compound and the acyclic amide compound include ethylenediamine having 2 carbon atoms, 1,3-diaminopropane having 3 carbon atoms, 1,4-diaminobutane having 4 carbon atoms, dimer diamine having 36 carbon atoms, phenylenediamine having 6 carbon atoms, metaxylylenediamine having 8 carbon atoms, paraxylylenediamine having 8 carbon atoms, and 2,4-diaminotoluene having 8 carbon atoms.

Further, examples of the triamine in the cyclic amide compound and the acyclic amide compound include triaminocyclohexane having 6 carbon atoms and trimer triamine having 54 carbon atoms.

Further, examples of the monoamine in the acyclic amide compound include ammonia having 0 carbon atoms, ethylamine having 2 carbon atoms, hexyl amine having 6 carbon atoms, octyl amine having 8 carbon atoms, and a stearyl amine having 18 carbon atoms.

Examples of the acyclic amide compound of [1+1] type in which a monocarboxylic acid and a monoamine are condensed include stearic acid amide (molecular weight: 283.49) and p-toluamide (molecular weight: 135.17). Moreover, examples of the acyclic amide compound of [1+1] type in which a monocarboxylic acid and a diamine are condensed include ethylenediamine monostearic acid amide (molecular weight: 326.56).

Examples of the acyclic amide compound of [2+1] type in which a monocarboxylic acid and a diamine are condensed include ethylenediamine bisstearic acid amide (molecular weight: 593.02), ethylenediamine bispalmitic acid amide (molecular weight: 536.9), and metaxylylenediamine bisstearic acid amide (molecular weight: 669.11).

Examples of the acyclic amide compound of [1+2] type in which a dicarboxylic acid and a monoamine are condensed include succinic acid bisstearylamide (molecular weight: 621.07), adipic acid bisstearylamide (molecular weight: 649.12), and sebacic acid bisstearylamide (molecular weight: 705.27).

The acyclic amide compound may also be substituted with one obtained by ring-opening polymerization of lactam, and examples thereof include 6-nylon obtained by ring-opening polymerization of ε-caprolactam and 12-nylon obtained by ring-opening polymerization of lauryl lactam.

The flux of the present embodiment contains, as the thixotropic agent, 0.1 wt % or more and 8.0 wt % or less of the cyclic amide compound described above, more preferably 0.1 wt % or more and 1.5 wt % or less of the cyclic amide compound and 0.5 wt % or more and 8.0 wt % or less of the acyclic amide compound, more preferably 0.5 wt % or more and 4.0 wt % or less of the acyclic amide compound, and the total amount of the cyclic amide compound and the acyclic amide compound is 1.5 wt % or more and 10.0 wt % or less.

When the amount of the cyclic amide compound is less than 0.1 wt %, the thixotropy is deteriorated. In addition, it is not possible to inhibit printing sagging or heating sagging. On the other hand, when the amount of the cyclic amide compound is more than 8.0 wt %, the total amount of the amide-based thixotropic agents is increased, so that precipitation occurs in the flux and the printability is deteriorated.

The flux of the present embodiment preferably includes an ester compound as the thixotropic agent, and contains 0 wt % or more and 8.0 wt % or less of the ester compound, more preferably 0 wt % or more and 4.0 wt % or less of the ester compound.

The flux of the present embodiment contains 30 wt % or more and 60 wt % or less of the rosin, more preferably 35 wt % or more and 60 wt % or less of the rosin, and 0.2 wt % or more and 10 wt % or less of the organic acid.

The flux of the present embodiment may further include an amine and a halogen, and the amine is contained in an amount of 0 wt % or more and 20 wt % or less, more preferably in an amount of 0 wt % or more and 5 wt % or less, and, as the halogen, an organohalogen compound is contained in an amount of 0 wt % or more and 5 wt % or less and an amine hydrohalide is contained in an amount of 0 wt % or more and 2 wt % or less.

The flux of the present embodiment may further include an antioxidant, and the antioxidant is contained in an amount of 0 wt % or more and 5 wt % or less. The remainder of the flux of the present embodiment is a solvent.

Examples of the rosin include raw material rosins such as gum rosin, wood rosin, and tall oil rosin, and derivatives obtained from the raw material rosins. Examples of the derivatives include purified rosins, hydrogenated rosins, disproportionated rosins, polymerized rosins, acid modified rosins, phenol modified rosins, and α,β unsaturated carboxylic acid modified products (acrylated rosins, maleated rosins, fumarated rosins, and the like); purified products, hydrides, and disproportionated products of the polymerized rosins; and purified products, hydrides, and disproportionated products of the α,β-unsaturated carboxylic acid modified products. One or two or more of these can be used.

Examples of the organic acid include glutaric acid, adipic acid, azelaic acid, eicosane diacid, citric acid, glycolic acid, succinic acid, salicylic acid, diglycolic acid, dipicolinic acid, dibutyl aniline diglycolic acid, suberic acid, sebacic acid, thioglycol acid, terephthalic acid, dodecanedioic acid, para-hydroxyphenylacetic acid, picolinic acid, phenylsuccinic acid, phthalic acid, fumaric acid, maleic acid, malonic acid, lauric acid, benzoic acid, tartaric acid, tris(2-carboxyethyl) isocyanurate, glycine, 1,3-cyclohexanedicarboxylic acid, 2,2-bis(hydroxymethyl)propionic acid, 2,2-bis(hydroxymethyl)butanoic acid, 2,3-dihydroxybenzoic acid, 2,4-diethyl glutaric acid, 2-quinolinecarboxylic acid, 3-hydroxybenzoic acid, malic acid, p-anisic acid, stearic acid, 12-hydroxystearic acid, oleic acid, linoleic acid, and linolenic acid.

Further, examples of the organic acid include dimer acid, trimer acid, hydrogenated dimer acid which is a hydrogenated product obtained by adding hydrogen to dimer acid, and hydrogenated trimer acid which is a hydrogenated product obtained by adding hydrogen to trimer acid.

For examples, there are listed: dimer acid which is a reactant of oleic acid and linoleic acid, trimer acid which is a reactant of oleic acid and linoleic acid, dimer acid which is a reactant of acrylic acid, trimer acid which is a reactant of acrylic acid, dimer acid which is a reactant of methacrylic acid, trimer acid which is a reactant of methacrylic acid, dimer acid which is a reactant of acrylic acid and methacrylic acid, trimer acid which is a reactant of acrylic acid and methacrylic acid, dimer acid which is a reactant of oleic acid, trimer acid which is a reactant of oleic acid, dimer acid which is a reactant of linoleic acid, trimer acid which is a reactant of linoleic acid, dimer acid which is a reactant of linolenic acid, trimer acid which is a reactant of linolenic acid, dimer acid which is a reactant of acrylic acid and oleic acid, trimer acid which is a reactant of acrylic acid and oleic acid, dimer acid which is a reactant of acrylic acid and linoleic acid, trimer acid which is a reactant of acrylic acid and linoleic acid, dimer acid which is a reactant of acrylic acid and linolenic acid, trimer acid which is a reactant of acrylic acid and linolenic acid, dimer acid which is a reactant of methacrylic acid and oleic acid, trimer acid which is a reactant of methacrylic acid and oleic acid, dimer acid which is a reactant of methacrylic acid and linoleic acid, trimer acid which is a reactant of methacrylic acid and linoleic acid, dimer acid which is a reactant of methacrylic acid and linolenic acid, trimer acid which is a reactant of methacrylic acid and linolenic acid, dimer acid which is a reactant of oleic acid and linolenic acid, trimer acid which is a reactant of oleic acid and linolenic acid, dimer acid which is a reactant of linoleic acid and linolenic acid, trimer acid which is a reactant of linoleic acid and linolenic acid, hydrogenated dimer acid which is a hydrogenated product of each of the dimer acids as described above, and hydrogenated trimer acid which is a hydrogenated product of each of the trimer acids described above.

Examples of the amine include monoethanolamine, diphenylguanidine, ethylamine, triethylamine, ethylenediamine, triethylenetetramine, 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzylimidazolium chloride, 2-methylimidazoline, 2-phenylimidazoline, 2,4-diamino-6-vinyl-s-triazine, 2,4-diamino-6-vinyl-s-triazine isocyanuric acid adduct, 2,4-diamino-6-methacryloyloxyethyl-s-triazine, epoxy-imidazole adduct, 2-methylbenzimidazole, 2-octylbenzimidazole, 2-pentylbenzimidazole, 2-(1-ethylpentyl)benzimidazole, 2-nonylbenzimidazole, 2-(4-thiazolyl)benzimidazole, benzimidazole, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], 6-(2-benzotriazolyl)-4-tert-octyl-6'-tert-butyl-4'-methyl-2,2'-methylene bisphenol, 1,2,3-benzotriazole, 1-[N,N-bis(2-ethylhexyl)aminomethyl]benzotriazole, carboxybenzotriazole, 1-[N,N-bis(2-ethylhexyl)aminomethyl]methyl benzotriazole, 2,2'-[[(methyl-1H-benzotriazol-1-yl)methyl]imino]bisethanol, 1-(1',2'-dicarboxyethyl)benzotriazole, 1-(2,3-dicarboxypropyl)benzotriazole, 1-[(2-ethylhexylamino) methyl]benzotriazole, 2,6-bis [(1H-benzotriazol-1-yl)methyl]-4-methylphenol, 5-methyl benzotriazole, and 5-phenyltetrazole.

Examples of the organohalogen compound include trans-2,3-dibromo-1,4-butenediol, triallyl isocyanurate hexabromide, 1-bromo-2-butanol, 1-bromo-2-propanol, 3-bromo-1- propanol, 3-bromo-1,2-propanediol, 1,4-dibromo-2-butanol, 1,3-dibromo-2-propanol, 2,3-dibromo-1-propanol, 2,3-dibromo-1,4-butanediol, and 2,3-dibromo-2-butene-1,4-diol.

The amine hydrohalide is a compound obtained by causing an amine and hydrogen halide to react, and examples thereof include aniline hydrochloride and aniline hydrobromide. As the amine of the amine hydrohalide, the above-described amines can be used, and examples thereof include ethylamine, ethylenediamine, triethylamine, methylimidazole, and 2-ethyl-4-methylimidazole. Examples of the hydrogen halide include hydrides of chlorine, bromine, iodine, and fluorine (hydrogen chloride, hydrogen bromide, hydrogen iodide, and hydrogen fluoride). Moreover, a borofluoride may be contained in place of, or in combination with, the amine hydrohalide, and examples of the borofluoride include fluoroboric acid.

Examples of the solvent include water, alcohol solvents, glycol ether solvents, and terpineols. Examples of such alcohol solvents include isopropyl alcohol, 1,2-butanediol, isobornylcyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 1,1,1-tris(hydroxymethyl)ethane, 2-ethyl-2-hydroxymethyl-1,3-propanediol, 2,2'-oxybis(methylene)bis(2-ethyl-1,3-propanediol), 2,2-bis(hydroxymethyl)-1,3-propanediol, 1,2,6-trihydroxyhexane, bis[2,2,2-tris(hydroxymethyl)ethyl]ether, 1-ethynyl-1-cyclohexanol, 1,4-cyclohexanediol, 1,4-cyclohexanedimethanol, erythritol, threitol, guaiacol glycerol ether, 3,6-dimethyl-4-octin-3,6-diol, and 2,4,7,9-tetramethyl-5-decyne-4,7-diol. Examples of such glycol ether solvents include hexyl diglycol, diethylene glycol mono-2-ethyl hexyl ether, ethylene glycol monophenyl ether, 2-methylpentane-2,4-diol, diethylene glycol dibutyl ether, and triethylene glycol monobutyl ether. Examples of the antioxidant include hindered phenolic antioxidants.

<Example of Solder Paste of Present Embodiment>

A solder paste of the present embodiment includes the above-described flux and metal powder. The metal powder is preferably Pb-free solder, and contains solder powder containing: Sn metal; Sn—Ag, Sn—Cu, Sn—Ag—Cu, Sn—Bi, Sn—In, or the like; or a product obtained by adding Sb, Bi, In, Cu, Zn, As, Ag, Cd, Fe, Ni, Co, Au, Ge, P, or the like to any of these alloys.

<Action/Effect Example of Flux and Solder Paste of Present Embodiment>

In a flux including a thixotropic agent, a rosin, an organic acid, and a solvent, in which the thixotropic agent contains a cyclic amide compound and an acyclic amide compound, it is possible to improve thixotropy and to inhibit precipitation of the thixotropic agent, without increasing the content of the acyclic amide compound, as compared with the case where the thixotropic agent contains the acyclic amide compound. In the solder paste using this flux, it is possible to obtain good printability with inhibited bleeding, blurring, and the like, and also to inhibit printing sagging in which the solder paste after printing flows. Furthermore, it is possible to inhibit heating sagging of the solder paste caused by heating at the time of soldering.

EXECUTED EXAMPLES

Fluxes of Executed Examples and Comparison Examples were prepared with the compositions shown in Tables 1 to 4 below, and solder pastes were prepared using the fluxes, to verify the thixotropy of each flux, and the printing sagging-inhibiting ability, the printability, and the heating sagging-inhibiting ability of each solder paste. The composition percentages in Tables 1 to 4 are expressed in wt (weight) % when the total amount of each flux is 100.

Each solder paste contains 11 wt % of each flux and 89 wt % of metal powder. The metal powder in each solder paste is a Sn—Ag—Cu solder alloy containing 3.0 wt % of Ag, 0.5 wt % of Cu, and the balance Sn, and the average particle size of the metal powder is φ20 μm.

<Evaluation of Thixotropy of Flux>

(1) Verification Method

The thixotropy was evaluated using a spiral viscometer in accordance with JIS Z3284-3 4.2. The rotational speed of the viscometer was set to 3 rpm and 30 rpm, and the viscosity after rotation for a predetermined time was read to calculate the thixotropic ratio.

(2) Criterion of Determination

◯◯: Thixotropic ratio was 0.60 or more

◯: Thixotropic ratio was 0.30 or more and less than 0.60 x: Thixotropic ratio was less than 0.30

<Evaluation of Printing Sagging-Inhibiting Ability of Solder Paste>

(1) Verification Method

The printing sagging-inhibiting ability of each solder paste was evaluated, in accordance with JIS Z 3284-3 4.3, by printing the solder paste on a copper plate using a stainless steel metal mask having a solder paste printing part formed in a predetermined pattern, removing the metal mask, then storing the printed copper plate at a room temperature of 25±5° C. and a relative humidity of 50±10% for 10 to 20 minutes, and visually confirming the minimum interval at which all the printed solder pastes were not integrated, in the respective printed patterns. The thickness of the metal mask is 0.2 mm, the solder paste printing part is a square opening, having a size of 3.0×1.5 mm. In the solder paste printing part, a plurality of openings having the same size are arranged at different intervals, and the intervals L between the respective openings are 0.2-0.3-0.4-0.5-0.6-0.7-0.8-0.9-1.0-1.1-1.2 mm.

(2) Criterion of Determination

◯: The minimum interval at which all the printed solder pastes were not integrated after printing was 0.2 mm or less x: The minimum interval at which all the printed solder pastes were not integrated after printing exceeded 0.2 mm <Evaluation of Printability of Solder Paste>

(1) Verification Method

The printability of each solder paste was evaluated, in accordance with JIS Z 3284-3 4.1, by printing the solder paste on a copper plate using a stainless steel metal mask having a solder paste printing part formed in a predetermined pattern, and visually confirming whether bleeding and/or blurring occurred at the initial stage of printing and at the time of continuous printing.

(2) Criterion of Determination

◯: Neither bleeding nor blurring occurred after printing x: Bleeding and/or blurring occurred after printing <Evaluation of Heating Sagging-Inhibiting Ability of Solder Paste>

(1) Verification Method

The heating sagging-inhibiting ability of each solder paste was evaluated, in accordance with JIS Z 3284-3 4.4, by printing the solder paste on a copper plate using a stainless steel metal mask having a solder paste printing part formed in a predetermined pattern, removing the metal mask, then heating the printed copper plate at 150±10° C. for 10 minutes, and visually confirming the minimum interval at which all the printed solder pastes were not integrated, in the respective printed patterns. The thickness of the metal mask is 0.2 mm, the solder paste printing part is a square opening, having a size of 3.0×1.5 mm. In the solder paste printing part, a plurality of openings having the same size are arranged at different intervals, and the intervals L between the respective openings are 0.2-0.3-0.4-0.5-0.6-0.7-0.8-0.9-1.0-1.1-1.2 mm.

(2) Criterion of Determination

◯: The minimum interval at which all the printed solder pastes were not integrated was 1.0 mm or less x: The minimum interval at which all the printed solder pastes were not integrated exceeded 1.0 mm

TABLE 1

| Material | | Executed Example 1 | Executed Example 2 | Executed Example 3 | Executed Example 4 | Executed Example 5 | Executed Example 6 | Executed Example 7 | Executed Example 8 | Executed Example 9 | Executed Example 10 |
|---|---|---|---|---|---|---|---|---|---|---|---|
| Organic acid | Succinic acid | | | | | 3 | | | 1 | | |
| | Glutaric acid | 3 | 3 | 3 | 3 | | | | 1 | 2 | 3 |
| | Adipic acid | | | | | | 3 | | | | |
| | Hydrogenated dimer acid | | | | | | | 3 | 1 | 8 | |
| Resin | Polymerized resin | 50 | 50 | 50 | 50 | 50 | 50 | 50 | 50 | 50 | 50 |
| Amine | 2-Phenylimidazole | | | | | | | | | | 5 |
| | 2-Phenyl-4-methylimidazole | | | | | | | | | | |
| Halogen | Amine hydrohalide | Diphenylguaridine-HBr | | | | | | | | | | |
| | Organohalogen compound | Trans-2,3-dibromo-2-butene-1,4-diol | | | | | | | | | | |
| Antioxidant | Hindered phenolic antioxidant | | | | | | | | | | |
| Thixotropic agent | Cyclic amide compound | Cyclic dehydration condensation compound of 1,6-hexanediamine adipic acid | | | | | 2 | | | | | |
| | | Cyclic dehydration condensation compound of 1,6-hexanediamine sebacic acid | 2 | 0.5 | 8 | | 2 | 2 | 2 | 2 | 2 | 2 |
| | Acyclic amide compound | Dehydration condensation compound of 1,6-hexanediamine adipic acid | | | | 4 | | | | | | |
| | | Dehydration condensation compound of 1,6-hexanediamine sebacic acid | 4 | 8 | 2 | | 4 | 4 | 4 | 4 | 4 | 4 |
| | Ester compound | Hydrogenated castor oil | | | | | | | | | | |
| Solvent | Tetraethylene glycol monomethyl ether | 41 | 38.5 | 32 | 41 | 41 | 41 | 41 | 41 | 34 | 36 |
| Total amount of amide-based thixotropic agents | | 6 | 8.5 | 10 | 6 | 6 | 6 | 6 | 6 | 6 | 6 |
| Total amount | | 100 | 100 | 100 | 100 | 100 | 100 | 100 | 100 | 100 | 100 |
| Thixotropy of faux | | ⊚ | ⊚ | ⊚ | ⊚ | ⊚ | ⊚ | ⊚ | ⊚ | ⊚ | ⊚ |
| Printing sagging-inhibiting ability of solder paste | | ○ | ○ | ○ | ○ | ○ | ○ | ○ | ○ | ○ | ○ |
| Printability of solder paste | | ○ | ○ | ○ | ○ | ○ | ○ | ○ | ○ | ○ | ○ |
| Heating sagging-inhibiting ability of solder paste | | ○ | ○ | ○ | ○ | ○ | ○ | ○ | ○ | ○ | ○ |
| Comprehensive evaluation | | ○ | ○ | ○ | ○ | ○ | ○ | ○ | ○ | ○ | ○ |

TABLE 2

| | Material | | Executed Example 11 | Executed Example 12 | Executed Example 13 | Executed Example 14 | Executed Example 15 | Executed Example 16 | Executed Example 17 | Executed Example 18 | Executed Example 19 | Executed Example 20 |
|---|---|---|---|---|---|---|---|---|---|---|---|---|
| Organic Acid | | Succinic acid | | | | | 0.2 | | | 3 | | |
| | | Glutaric acid | 3 | 3 | 3 | 3 | | 3 | 3 | | | |
| | | Adipic acid | | | | | | | | | 3 | |
| | | Hydrogenated dimer acid | | | | | | | | | | 3 |
| Resin | | Polymerized resin | 50 | 50 | 50 | 50 | 50 | 50 | 50 | 50 | 50 | 50 |
| Amine | | 2-Phenyl-imidazole | | | | | 5 | | | | | |
| | | 2-Phenyl-4-methylimidazole | 5 | | | | | | | | | |
| Halogen | Amine hydrohalide | Diphenyl-guanidine-HBr | | 2 | | | 1 | | | | | |
| | Organohalogen compound | Trans-2,3-dibromo-2-butene-1,4-diol | | | 5 | | 3 | | | | | |
| Antioxidant | | Hindered phenolic antioxidant | | | | 5 | 3 | | | | | |
| Thixotropic agent | Cyclic amide compound | Cyclic dehydration condensation compound of 1,6-hexanediamine adipic acid | | | | | | | | | | |
| | | Cyclic dehydration condensation compound of 1,6-hexanediamine sebacic acid | 2 | 2 | 2 | 2 | 2 | 2 | 2 | 1.5 | 1.5 | 1.5 |
| | Acyclic amide compound | Dehydration condensation compound of 1,6-hexanediamine adipic acid | | | | | | | | | | |
| | | Dehydration condensation compound of 1,6-hexanediamine sebacic acid | 4 | 4 | 4 | 4 | 4 | 4 | 4 | 2.5 | 2.5 | 2.5 |
| | Ester compound | Hydrogenated castor oil | | | | | | | | 2 | 2 | 2 |
| Solvent | | Tetraethylene glycol monomethyl ether | 36 | 39 | 36 | 36 | 31.8 | 56 | 31 | 41 | 41 | 41 |
| Total amount of amide-based thixotropic agents | | | 6 | 6 | 6 | 6 | 6 | 6 | 6 | 4 | 4 | 4 |
| Total amount | | | 100 | 100 | 100 | 100 | 100 | 100 | 100 | 100 | 100 | 100 |
| Thixotropy of faux | | | ○○ | ○○ | ○○ | ○○ | ○○ | ○○ | ○○ | ○○ | ○○ | ○○ |
| Printing sagging-inhibiting ability of solder paste | | | ○ | ○ | ○ | ○ | ○ | ○ | ○ | ○ | ○ | ○ |
| Printability of solder paste | | | ○ | ○ | ○ | ○ | ○ | ○ | ○ | ○ | ○ | ○ |
| Heating sagging-inhibiting ability of solder paste | | | ○ | ○ | ○ | ○ | ○ | ○ | ○ | ○ | ○ | ○ |
| Comprehensive evaluation | | | ○ | ○ | ○ | ○ | ○ | ○ | ○ | ○ | ○ | ○ |

TABLE 3

| Material | | Executed Example 21 | Executed Example 22 | Executed Example 23 | Executed Example 24 | Executed Example 25 | Executed Example 26 | Executed Example 27 | Executed Example 28 | Executed Example 29 | Executed Example 30 |
|---|---|---|---|---|---|---|---|---|---|---|---|
| Organic Acid | Succinic acid | 1 | | | | | | | 0.2 | | |
| | Glutaric acid | 1 | 2 | 3 | 3 | 3 | 3 | 3 | | 3 | 3 |
| | Adipic acid | | | | | | | | | | |
| | Hydrogenated dimer acid | 1 | 8 | | | | | | | | |
| Resin | Polymerized resin | 50 | 50 | 50 | 50 | 50 | 50 | 50 | 50 | 35 | 60 |
| Amine | 2-Phenylimidazole | | | 5 | | | | | 5 | | |
| | 2-Phenyl-4-methylimidazole | | | | 5 | | | | | | |
| Halogen | Amine hydrohalide | Diphenylguaridine-HBr | | | | | 2 | | 1 | | | |
| | Organohalogen compound | Trans-2,3-dibromo-2-butene-1,4-diol | | | | | | 5 | 3 | | | |
| Antioxidant | Hindered phenolic antioxidant | | | | | | | 5 | 3 | | |
| Thixotropic agent | Cyclic amide compound | Cyclic dehydration condensation compound of 1,6-hexanediamine adipic acid | | | | | | | | | | |
| | | Cyclic dehydration condensation compound of 1,6-hexanediamine sebacic acid | 1.5 | 1.5 | 1.5 | 1.5 | 1.5 | 1.5 | 1.5 | 1.5 | 1.5 | 1.5 |
| | Acyclic amide compound | Dehydration condensation compound of 1,6-hexanediamine adipic acid | | | | | | | | | | |
| | | Dehydration condensation compound of 1,6-hexanediamine sebacic acid | 2.5 | 2.5 | 2.5 | 2.5 | 2.5 | 2.5 | 2.5 | 2.5 | 2.5 | 2.5 |
| | Ester compound | Hydrogenated castor oil | 2 | 2 | 2 | 2 | 2 | 2 | 2 | 2 | 2 | 2 |
| Solvent | Tetraethylene glycol monomethyl ether | 41 | 34 | 36 | 36 | 39 | 36 | 36 | 31.8 | 56 | 31 |
| Total amount of amide-based thixotropic agents | | 4 | 4 | 4 | 4 | 4 | 4 | 4 | 4 | 4 | 4 |
| Total amount | | 100 | 100 | 100 | 100 | 100 | 100 | 100 | 100 | 100 | 100 |
| Thixotropy of faux | | ∘∘ | ∘∘ | ∘∘ | ∘∘ | ∘∘ | ∘∘ | ∘∘ | ∘∘ | ∘∘ | ∘∘ |
| Printing sagging-inhibiting ability of solder paste | | ∘ | ∘ | ∘ | ∘ | ∘ | ∘ | ∘ | ∘ | ∘ | ∘ |
| Printability of solder paste | | ∘ | ∘ | ∘ | ∘ | ∘ | ∘ | ∘ | ∘ | ∘ | ∘ |
| Heating sagging-inhibiting ability of solder paste | | ∘ | ∘ | ∘ | ∘ | ∘ | ∘ | ∘ | ∘ | ∘ | ∘ |
| Comprehensive evaluation | | ∘ | ∘ | ∘ | ∘ | ∘ | ∘ | ∘ | ∘ | ∘ | ∘ |

TABLE 4

| Material | | Executed Example 31 | Executed Example 32 | Executed Example 33 | Executed Example 34 | Executed Example 35 | Executed Example 36 | Executed Example 37 | Comparison Example 1 | Comparison Example 2 | Comparison Example 3 | Comparison Example 4 |
|---|---|---|---|---|---|---|---|---|---|---|---|---|
| Organic Acid | Succinic acid | | | | | | | | | | | |
| | Glutaric acid | 3 | 3 | 3 | 3 | 3 | 3 | 3 | 3 | 3 | 3 | 3 |
| | Adipic acid | | | | | | | | | | | |
| | Hydrogenated dimer acid | | | | | | | | | | | |
| Resin | Polymerized resin | 50 | 50 | 50 | 50 | 50 | 50 | 50 | 50 | 50 | 50 | 50 |
| Amine | 2-Phenylimidazole | | | | | | | | | | | |
| | 2-Phenyl-4-methylimidazole | | | | | | | | | | | |
| Halogen | Amine hydrohalide | Diphenylguanidine-HBr | | | | | | | | | | | |
| | Organohalogen compound | Trans-2,3-dibromo-2-butene-1,4-diol | | | | | | | | | | | |
| Antioxidant | Hindered phenolic antioxidant | | | | | | | | | | | |
| Thixotropic agent | Cyclic amide compound | Cyclic dehydration condensation compound of 1,6-hexanediamine adipic acid | | | | | | | | | | | |
| | | Cyclic dehydration condensation compound of 1,6-hexanediamine sebacic acid | 2 | 0.5 | 1.5 | 0.5 | 0.1 | 0.3 | 0.3 | 0.1 | 0.1 | | |
| | Acyclic amide compound | Dehydration condensation compound of 1,6-hexanediamine adipic acid | | | | | | | | | | | |
| | | Dehydration condensation compound of 1,6-hexanediamine sebacic acid | 4 | 1 | 0.5 | 1.5 | 2.5 | 2.5 | 8 | 0.1 | 0.5 | 15 | |
| | Ester compound | Hydrogenated castor oil | 0.5 | 4 | 4 | 4 | 4 | 3 | 0 | | | | 5 |
| Solvent | Tetraethylene glycol monomethyl ether | 40.5 | 41.5 | 41 | 41 | 40.4 | 41.2 | 38.7 | 46.8 | 46.4 | 32 | 42 |
| Total amount of amide-based thixotropic agents | | 6 | 1.5 | 2 | 2 | 2.6 | 2.8 | 8.3 | 0.2 | 0.6 | 15 | 0 |
| Total amount | | 100 | 100 | 100 | 100 | 100 | 100 | 100 | 100 | 100 | 100 | 100 |
| Thixotropy of faux | | ○○ | ○ | ○ | ○ | ○ | ○ | ○○ | x | x | ○○ | ○○ |
| Printing sagging-inhibiting ability of solder paste | | ○ | ○ | ○ | ○ | ○ | ○ | ○ | x | x | ○ | ○ |
| Printability of solder paste | | ○ | ○ | ○ | ○ | ○ | ○ | ○ | x | x | x | ○ |
| Heating sagging-inhibiting ability of solder paste | | ○ | ○ | ○ | ○ | ○ | ○ | ○ | x | x | ○ | x |
| Comprehensive evaluation | | ○ | ○ | ○ | ○ | ○ | ○ | ○ | x | x | ○ | x |

In the present invention, the cyclic amide compound obtained by cyclic polycondensation of sebacic acid as a dicarboxylic acid having 10 carbon atoms and 1,6-hexanediamine as a diamine having 6 carbon atoms and the acyclic amide compound obtained by acyclic polycondensation of sebacic acid as a dicarboxylic acid having 10 carbon atoms and 1,6-hexanediamine as a diamine having 6 carbon atoms were contained, as the thixotropic agent, as indicated in Executed Examples 1 to 3, within the ranges defined in the present invention, thereby making it possible to improve the thixotropy of the flux and to inhibit the precipitation of the thixotropic agent. Also, in the solder paste using this flux, it was possible to obtain good printability with inhibited bleeding, blurring, and the like, and also to inhibit printing sagging in which the solder paste after printing flows. Furthermore, it was possible to inhibit heating sagging of the solder paste caused by heating at the time of soldering.

By virtue of the fact that the cyclic amide compound was contained in an amount of 0.5 wt % as in Executed Example 2, even when the acyclic amide compound was contained in an amount of 8 wt %, none of the thixotropy of the flux and the printing sagging-inhibiting ability, the printability, and the heating sagging-inhibiting ability of the solder paste was inhibited, and sufficient effects thereon were obtained. Further, by virtue of the fact that the cyclic amide compound was contained in an amount of 8.0 wt % as in Executed Example 3, none of the thixotropy of the flux and the printing sagging-inhibiting ability, the printability, and the heating sagging-inhibiting ability of the solder paste was inhibited, and sufficient effects thereon were obtained. Thus, the cyclic amide compound obtained by cyclic polycondensation of a dicarboxylic acid having 10 carbon atoms and a diamine having 6 carbon atoms and the acyclic amide compound obtained by acyclic polycondensation of a dicarboxylic acid having 10 carbon atoms and a diamine having 6 carbon atoms were contained within the ranges defined in the present invention, so that sufficient effects on the thixotropy of the flux and the printing sagging-inhibiting ability, the printability, and the heating sagging-inhibiting ability of the solder paste were obtained.

Also, by virtue of the fact that, as the thixotropic agent, the cyclic amide compound obtained by cyclic polycondensation of adipic acid as a dicarboxylic acid having 6 carbon atoms and 1,6-hexanediamine as a diamine having 6 carbon atoms was contained in an amount of 2 wt % and that the acyclic amide compound obtained by acyclic polycondensation of adipic acid as a dicarboxylic acid having 6 carbon atoms and 1,6-hexanediamine as a diamine having 6 carbon atoms was contained in an amount of 4 wt %, as indicated in Executed Example 4, none of the thixotropy of the flux and the printing sagging-inhibiting ability, the printability, and the heating sagging-inhibiting ability of the solder paste was inhibited, and sufficient effects thereon were obtained. Thus, by virtue of the fact that the cyclic amide compound obtained by cyclic polycondensation of a dicarboxylic acid having 6 carbon atoms and a diamine having 6 carbon atoms and the acyclic amide compound obtained by acyclic polycondensation of a dicarboxylic acid having 6 carbon atoms and a diamine having 6 carbon atoms were contained within the ranges defined in the present invention, sufficient effects on the thixotropy of the flux and the printing sagging-inhibiting ability, the printability, and the heating sagging-inhibiting ability of the solder paste were obtained.

By virtue of the fact that the cyclic amide compound and the acyclic amide compound were contained, as the thixotropic agent, within the ranges defined in the present invention, as indicated in Executed Examples 5 to 9, sufficient effects on the thixotropy of the flux and the printing sagging-inhibiting ability, the printability, and the heating sagging-inhibiting ability of the solder paste were obtained also by changing the kind of organic acid within the range defined in the present invention, combining a plurality of kinds of organic acids, or changing the amount of the organic acid.

By virtue of the fact that the cyclic amide compound and the acyclic amide compound were contained, as the thixotropic agent, within the ranges defined in the present invention and further that the amine was contained within the range defined in the present invention, as indicated in Executed Examples 10 and 11, sufficient effects on the thixotropy of the flux and the printing sagging-inhibiting ability, the printability, and the heating sagging-inhibiting ability of the solder paste were obtained.

By virtue of the fact that the cyclic amide compound and the acyclic amide compound were contained, as the thixotropic agent, within the ranges defined in the present invention and further that the halogen was contained within the range defined in the present invention, as indicated in Executed Examples 12 and 13, sufficient effects on the thixotropy of the flux and the printing sagging-inhibiting ability, the printability, and the heating sagging-inhibiting ability of the solder paste were obtained.

By virtue of the fact that the cyclic amide compound and the acyclic amide compound were contained, as the thixotropic agent, within the ranges defined in the present invention and further that the antioxidant was contained within the range defined in the present invention, as indicated in Executed Example 14, sufficient effects on the thixotropy of the flux and the printing sagging-inhibiting ability, the printability, and the heating sagging-inhibiting ability of the solder paste were obtained.

By virtue of the fact that the cyclic amide compound and the acyclic amide compound were contained, as the thixotropic agent, within the ranges defined in the present invention and further that the amine, the halogen, and the antioxidant were contained within the ranges defined in the present invention, as indicated in Executed Example 15, sufficient effects on the thixotropy of the flux and the printing sagging-inhibiting ability, the printability, and the heating sagging-inhibiting ability of the solder paste were obtained even when the amount of the organic acid was reduced within the range defined in the present invention.

By virtue of the fact that the cyclic amide compound and the acyclic amide compound were contained, as the thixotropic agent, within the ranges defined in the present invention, as indicated in Executed Examples 16 and 17, sufficient effects on the thixotropy of the flux and the printing sagging-inhibiting ability, the printability, and the heating sagging-inhibiting ability of the solder paste were obtained also by changing the amount of the rosin within the range defined in the present invention.

By virtue of the fact that the cyclic amide compound and the acyclic amide compound were contained, as the thixotropic agent, within the ranges defined in the present invention, and further that the ester compound was contained, as the thixotropic agent, within the range defined in the present invention, as indicated in Executed Examples 18 to 22, sufficient effects on the thixotropy of the flux and the printing sagging-inhibiting ability, the printability, and the heating sagging-inhibiting ability of the solder paste were obtained also by changing the kind of organic acid within the range defined in the present invention, combining a plurality of kinds of organic acids, or changing the amount of the organic acid.

By virtue of the fact that the cyclic amide compound and the acyclic amide compound were contained, as the thixotropic agent, within the ranges defined in the present invention, further that the ester compound was contained, as the thixotropic agent, within the range defined in the present invention, and that the amine was contained within the range defined in the present invention, as indicated in Executed Examples 23 and 24, sufficient effects on the thixotropy of the flux and the printing sagging-inhibiting ability, the printability, and the heating sagging-inhibiting ability of the solder paste were obtained.

By virtue of the fact that the cyclic amide compound and the acyclic amide compound were contained, as the thixotropic agent, within the ranges defined in the present invention, further that the ester compound was contained, as the thixotropic agent, within the range defined in the present invention, and further that the halogen was contained within the range defined in the present invention, as indicated in Executed Examples 25 and 26, sufficient effects on the thixotropy of the flux and the printing sagging-inhibiting ability, the printability, and the heating sagging-inhibiting ability of the solder paste were obtained.

By virtue of the fact that the cyclic amide compound and the acyclic amide compound were contained, as the thixotropic agent, within the ranges defined in the present invention, further that the ester compound was contained, as the thixotropic agent, within the range defined in the present invention, and further that the antioxidant was contained within the range defined in the present invention, as indicated in Executed Example 27, sufficient effects on the thixotropy of the flux and the printing sagging-inhibiting ability, the printability, and the heating sagging-inhibiting ability of the solder paste were obtained.

By virtue of the fact that the cyclic amide compound and the acyclic amide compound were contained, as the thixotropic agent, within the ranges defined in the present invention, further that the ester compound was contained, as the thixotropic agent, within the range defined in the present invention, and further that the amine, the halogen, and the antioxidant were contained within the ranges defined in the present invention, as indicated in Executed Example 28, sufficient effects on the thixotropy of the flux and the printing sagging-inhibiting ability, the printability, and the heating sagging-inhibiting ability of the solder paste were obtained even when the amount of the organic acid was reduced within the range defined in the present invention.

By virtue of the fact that the cyclic amide compound and the acyclic amide compound were contained, as the thixotropic agent, within the ranges defined in the present invention, and further that the ester compound was contained, as the thixotropic agent, within the range defined in the present invention, as indicated in Executed Examples 29 and 30, sufficient effects on the thixotropy of the flux and the printing sagging-inhibiting ability, the printability, and the heating sagging-inhibiting ability of the solder paste were obtained also by changing the amount of the rosin within the range defined in the present invention.

By virtue of the fact that the cyclic amide compound and the acyclic amide compound were contained, as the thixotropic agent, within the ranges defined in the present invention, and further that the ester compound was contained, as the thixotropic agent, within the range defined in the present invention, as indicated in Executed Example 31, sufficient effects on the thixotropy of the flux and the printing sagging-inhibiting ability, the printability, and the heating sagging-inhibiting ability of the solder paste were obtained even when the amount of the ester compound was reduced.

By virtue of the fact that the cyclic amide compound and the acyclic amide compound were contained, as the thixotropic agent, within the ranges defined in the present invention, and further that the ester compound was contained as the thixotropic agent within the range defined in the present invention, as indicated in Executed Examples 32 to 34, sufficient effects on the thixotropy of the flux and the printing sagging-inhibiting ability, the printability, and the heating sagging-inhibiting ability of the solder paste were obtained by increasing the amount of the ester compound and decreasing the acyclic amide compound. Further, when the solder paste was heated at a temperature ranging from 25° C. to 250° C. at 1° C./sec through $N_2$ reflow, ultrasonic-cleaned using a solvent within a beaker, and dried, and the dried product was visually confirmed, no flux residue was present, and washability was obtained.

By virtue of the fact that the cyclic amide compound was contained in an amount of 0.1 wt % as the lower limit value of the range defined in the present invention, further that the acyclic amide compound was contained in an amount of 2.5 wt % within the range defined in the present invention, that the total amount of the cyclic amide compound and the acyclic amide compound fell within the range defined in the present invention, and further that an ester compound was contained, as the thixotropic agent, within the range defined in the present invention, as indicated in Executed Example 35, sufficient effects on the thixotropy of the flux and the printing sagging-inhibiting ability, the printability, and the heating sagging-inhibiting ability of the solder paste were obtained.

By virtue of the fact that the cyclic amide compound was contained in an amount of 0.3 wt % which was increased from the lower limit value of the range defined in the present invention, that the acyclic amide compound was contained in an amount of 2.5 wt % which was the same as the value in Executed Example 35, and that the total amount of the cyclic amide compound and the acyclic amide compound fell within the range defined in the present invention, as indicated in Executed Example 36, sufficient effects on the thixotropy of the flux and the printing sagging-inhibiting ability, the printability, and the heating sagging-inhibiting ability of the solder paste were obtained even when the content of the ester compound was decreased as compared with that in Executed Example 35.

By virtue of the fact that the cyclic amide compound was contained in an amount of 0.3 wt % which was the same as the value in Executed Example 36, that the acyclic amide compound was contained in an amount of 8 wt % within the range defined in the present invention, and that the total amount of the cyclic amide compound and the acyclic amide compound fell within the range defined in the present invention, as indicated in Executed Example 37, sufficient effects on the thixotropy of the flux and the printing sagging-inhibiting ability, the printability, and the heating sagging-inhibiting ability of the solder paste were obtained without including an ester compound as the thixotropic agent.

On the other hand, as indicated in Comparison Example 1, even though the cyclic amide compound was contained, as the thixotropic agent, within the range defined in the present invention, when the content of the acyclic amide compound fell outside the range defined in the present invention and the total amount of the cyclic amide compound and the acyclic amide compound fell outside the range defined in the present invention, no effect on the thixotropy of the flux or the printing sagging-inhibiting ability, the printability, or the heating sagging-inhibiting ability of the solder paste was obtained.

As indicated in Comparison Example 2, even though the cyclic amide compound and the acyclic amide compound were contained, as the thixotropic agent, within the ranges defined in the present invention, when the total amount of the cyclic amide compound and the acyclic amide compound fell outside the range defined in the present invention, no effect on the thixotropy of the flux or the printing sagging-inhibiting ability, the printability, or the heating sagging-inhibiting ability of the solder paste was obtained.

Furthermore, when no cyclic amide compound was contained as the thixotropic agent, and an acyclic amide compound was contained without the range defined in the present invention, as indicated in Comparison Example 3, effects on the thixotropy of the flux and the printing sagging-inhibiting ability and the heating sagging-inhibiting ability of the solder paste were obtained, but no effect on the printability was obtained.

In addition, when neither the cyclic amide compound nor the acyclic amide compound was contained as the thixotropic agent, and an ester compound was contained within the range defined in the present invention, as indicated in Comparison Example 4, effects on the thixotropy of the flux and the printing sagging-inhibiting ability and the printability of the solder paste were obtained, but no effect on the heating sagging-inhibiting ability was obtained.

Also by virtue of the fact that the thixotropic agent contained a cyclic amide compound and an acyclic amide compound using malonic acid, succinic acid, glutaric acid, pimelic acid, suberic acid, azelaic acid, cyclohexanedicarboxylic acid, phthalic acid, terephthalic acid, or the like as a dicarboxylic acid, sufficient effects on the thixotropy of the flux and the printing sagging-inhibiting ability, the printability, and the heating sagging-inhibiting ability of the solder paste were obtained.

In addition, by virtue of the fact that the thixotropic agent contained a cyclic amide compound and an acyclic amide compound using cyclohexanetricarboxylic acid, benzenetricarboxylic acid, or the like as a tricarboxylic acid, sufficient effects on the thixotropy of the flux and the printing sagging-inhibiting ability, the printability, and the heating sagging-inhibiting ability of the solder paste were obtained.

Furthermore, by virtue of the fact that the thixotropic agent contained a cyclic amide compound and an acyclic amide compound using ethylenediamine, 1,3-diaminopropane, 1,4-diaminobutane, dimer diamine, phenylenediamine, metaxylylenediamine, paraxylylenediamine, 2,4-diaminotoluene, or the like as a diamine, sufficient effects on the thixotropy of the flux and the printing sagging-inhibiting ability, the printability, and the heating sagging-inhibiting ability of the solder paste were obtained.

In addition, by virtue of the fact that the thixotropic agent contained a cyclic amide compound and an acyclic amide compound using triaminocyclohexane, trimer triamine, or the like as a triamine, sufficient effects on the thixotropy of the flux and the printing sagging-inhibiting ability, the printability, and the heating sagging-inhibiting ability of the solder paste were obtained.

Furthermore, by virtue of the fact that the thixotropic agent contained an acyclic amide compound using acetic acid, palmitic acid, stearic acid, 12-hydroxystearic acid, behenic acid, montanic acid, or the like as a monocarboxylic acid, sufficient effects on the thixotropy of the flux and the printing sagging-inhibiting ability, the printability, and the heating sagging-inhibiting ability of the solder paste were obtained.

Also, by virtue of the fact that the thixotropic agent contained an acyclic amide compound using ammonia, ethylamine, hexylamine, octylamine, stearylamine, or the like as a monoamine, sufficient effects on the thixotropy of the flux and the printing sagging-inhibiting ability, the printability, and the heating sagging-inhibiting ability of the solder paste were obtained.

Furthermore, by virtue of the fact that the thixotropic agent contained an acyclic amide compound obtained by ring-opening polymerization of lactam, sufficient effects on the thixotropy of the flux and the printing sagging-inhibiting ability, the printability, and the heating sagging-inhibiting ability of the solder paste were obtained.

From the above, in the flux of the present invention including a thixotropic agent, a rosin, an organic acid and a solvent, wherein the thixotropic agent contained a cyclic amide compound obtained by cyclic polycondensation of a dicarboxylic acid and/or a tricarboxylic acid, and a diamine and/or a triamine and an acyclic amide compound obtained by acyclic polycondensation of a monocarboxylic acid, a dicarboxylic acid and/or a tricarboxylic acid, and a monoamine, a diamine and/or a triamine or an acyclic amide compound obtained by ring-opening polymerization of lactam, wherein the dicarboxylic acid and the tricarboxylic acid of the cyclic amide compound had 3 or more and 10 or less carbon atoms, and the diamine and the triamine thereof had 2 or more and 54 or less carbon atoms, wherein the monocarboxylic acid, the dicarboxylic acid and the tricarboxylic acid of the acyclic amide compound had 2 or more and 28 or less carbon atoms, and the monoamine, the diamine and the triamine thereof had 0 or more and 54 or less carbon atoms, wherein the thixotropic agent contained 0.1 wt % or more and 8.0 wt % or less, more preferably 0.1 wt % or more and 1.5 wt % or less of the cyclic amide compound and 0.5 wt % or more and 8.0 wt % or less, more preferably 0.5 wt % or more and 4.0 wt % or less of the acyclic amide compound, and wherein the total amount of the cyclic amide compound and the acyclic amide compound was 1.5 wt % or more and 10.0 wt % or less, it was possible to improve thixotropy and to inhibit precipitation of the thixotropic agent, without increasing the content of the acyclic amide compound, as compared with the case where the thixotropic agent contains the acyclic amide compound.

In a solder paste using this flux, it was possible to obtain good printability with inhibited bleeding, blurring, and the like, and also to inhibit printing sagging in which the solder paste after printing flows. Furthermore, it was possible to inhibit heating sagging of the solder paste caused by heating at the time of soldering.

Furthermore, the flux according to the present invention contains 0 wt % or more and 8.0 wt % or less, more preferably 0 wt % or more and 4.0 wt % or less of the ester compound as the thixotropic agent, and 30 wt % or more and 60 wt % or less, more preferably 35 wt % or more and 60 wt % or less of the rosin, 0.2 wt % or more and 10 wt % or less of the organic acid, 0 wt % or more and 20 wt % or less, more preferably 0 wt % or more and 5 wt % or less of the amine, 0 wt % or more and 5 wt % or less of the organohalogen compound, 0 wt % or more and 2 wt % or less of the amine hydrohalide, and 0 wt % or more and 5 wt % or less an antioxidant, and the balance being the solvent. By virtue of such a composition, none of the thixotropy of the flux and the printing sagging-inhibiting ability, the printability, and the heating sagging-inhibiting ability of the solder paste was inhibited, and sufficient effects thereon were obtained.

The invention claimed is:
1. A flux comprising:
an organic acid;
a rosin;
a thixotropic agent; and
a solvent,
wherein the thixotropic agent contains a cyclic amide compound and an acyclic amide compound, and the flux contains 0.1 wt % or more and 8.0 wt % or less of the cyclic amide compound and 0.5 wt % or more and 8.0 wt % or less of the acyclic amide compound, a total amount of the cyclic amide compound and the acyclic amide compound being 1.5 wt % or more and 10.0 wt % or less based on the total weight of the flux,
wherein the cyclic amide compound is an amide compound with a molecular weight of 3,000 or less, obtained by cyclic polycondensation of a dicarboxylic acid and/or a tricarboxylic acid, and a diamine and/or a triamine, and wherein the acyclic amide compound is an amide compound obtained by acyclic condensation of a monocarboxylic acid, a dicarboxylic acid, and/or a tricarboxylic acid, and a monoamine, a diamine, and/or a triamine.

2. The flux according to claim 1, wherein the dicarboxylic acid and the tricarboxylic acid of the cyclic amide compound have 3 or more and 10 or less carbon atoms.

3. The flux according to claim 2, wherein the diamine and the triamine of the cyclic amide compound have 2 or more and 54 or less carbon atoms.

4. The flux according to claim 2, wherein the diamine and triamine of the cyclic amide compound have 6 carbon atoms.

5. The flux according to claim 1, wherein the dicarboxylic acid and the tricarboxylic acid of the cyclic amide compound have 6 or more and 10 or less carbon atoms.

6. The flux according to claim 5, wherein the diamine and the triamine of the cyclic amide compound have 2 or more and 54 or less carbon atoms.

7. The flux according to claim 5, wherein the diamine and triamine of the cyclic amide compound have 6 carbon atoms.

8. The flux according to claim 1, wherein the cyclic amide compound is an amide compound obtained by cyclic polycondensation of a dicarboxylic acid having 3 or more and 10 or less carbon atoms and a diamine having 2 or more and 54 or less carbon atoms.

9. The flux according to claim 1, wherein the cyclic amide compound is an amide compound obtained by cyclic polycondensation of a dicarboxylic acid having 6 or more and 10 or less carbon atoms and a diamine having 6 carbon atoms.

10. The flux according to claim 1,
wherein the dicarboxylic acid and the tricarboxylic acid of the cyclic amide compound have 3 or more and 10 or less carbon atoms, and the diamine and the triamine of the cyclic amide compound have 2 or more and 54 or less carbon atoms, and wherein the monocarboxylic acid, the dicarboxylic acid, and the tricarboxylic acid of the acyclic amide compound have 2 or more and 28 or less carbon atoms, and the monoamine, the diamine and the triamine of the acyclic amide compound have 0 or more and 54 or less carbon atoms.

11. The flux according to claim 1, wherein the thixotropic agent further contains an ester compound.

12. The flux according to claim 11, wherein the thixotropic agent contains hydrogenated castor oil as the ester compound.

13. The flux according to claim 11, wherein the flux contains more than 0 wt % and 8.0 wt % or less of the ester compound.

14. The flux according to claim 13, comprising:
30 wt % or more and 60 wt % or less of the rosin; and
0.2 wt % or more and 10 wt % or less of the organic acid, and further comprising:
0 wt % or more and 5 wt % or less of an organohalogen compound;
0 wt % or more and 2 wt % or less of an amine hydrohalide;
0 wt % or more and 20 wt % or less of an amine other than the amine hydrohalide; and
0 wt % or more and 5 wt % or less of an antioxidant.

15. The flux according to claim 11, comprising:
30 wt % or more and 60 wt % or less of the rosin; and
0.2 wt % or more and 10 wt % or less of the organic acid, and further comprising:
0 wt % or more and 5 wt % or less of an organohalogen compound;
0 wt % or more and 2 wt % or less of an amine hydrohalide;
0 wt % or more and 20 wt % or less of an amine other than the amine hydrohalide; and
0 wt % or more and 5 wt % or less of an antioxidant.

16. The flux according to claim 1, wherein the flux contains 0.1 wt % or more and 1.5 wt % or less of the cyclic amide compound and 0.5 wt % or more and 4.0 wt % or less of the acyclic amide compound.

17. The flux according to claim 1, comprising:
30 wt % or more and 60 wt % or less of the rosin; and
0.2 wt % or more and 10 wt % or less of the organic acid, and further comprising:
0 wt % or more and 2 wt % or less of an amine hydrohalide;
0 wt % or more and 20 wt % or less of an amine other than the amine hydrohalide; and
0 wt % or more and 5 wt % or less of an antioxidant.

18. A solder paste comprising:
metal powder; and
a flux, the flux comprising:
an organic acid;
a rosin;
a thixotropic agent; and
a solvent,
wherein the thixotropic agent contains a cyclic amide compound and an acyclic amide compound, and the flux contains 0.1 wt % or more and 8.0 wt % or less of the cyclic amide compound and 0.5 wt % or more and 8.0 wt % or less of the acyclic amide compound, a total amount of the cyclic amide compound and the acyclic amide compound being 1.5 wt % or more and 10.0 wt % or less based on the total weight of the flux, wherein the cyclic amide compound is an amide compound with a molecular weight of 3,000 or less, obtained by cyclic polycondensation of a dicarboxylic acid and/or a tricarboxylic acid, and a diamine and/or a triamine, and wherein the acyclic amide compound is an amide compound obtained by acyclic condensation of a monocarboxylic acid, a dicarboxylic acid, and/or a tricarboxylic acid, and a monoamine, a diamine, and/or a triamine.

19. The solder paste according to claim 18, comprising the flux, wherein the flux contains 0 wt % or more and 8.0 wt % or less of an ester compound as part of the thixotropic agent.

20. The solder paste according to claim 18, wherein the flux comprises:
30 wt % or more and 60 wt % or less of the rosin; and
0.2 wt % or more and 10 wt % or less of the organic acid, and further comprising:
0 wt % or more and 5 wt % or less of an organohalogen compound;
0 wt % or more and 2 wt % or less of an amine hydrohalide;
0 wt % or more and 20 wt % or less of an amine other than the amine hydrohalide; and
0 wt % or more and 5 wt % or less of an antioxidant.

* * * * *

UNITED STATES PATENT AND TRADEMARK OFFICE
CERTIFICATE OF CORRECTION

PATENT NO. : 11,130,202 B2
APPLICATION NO. : 16/757440
DATED : September 28, 2021
INVENTOR(S) : Hiroyoshi Kawasaki et al.

It is certified that error appears in the above-identified patent and that said Letters Patent is hereby corrected as shown below:

On the Title Page

Column 2, Item (56) Other Publications, Line 1, delete "translaion" and insert -- translation --

In the Claims

Column 28, Line 19, Claim 17, below "comprising:" insert -- 0 wt % or more and 5 wt % or less of an organohalogen compound; --

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*